(12) United States Patent
Jeon et al.

(10) Patent No.: US 9,484,598 B2
(45) Date of Patent: *Nov. 1, 2016

(54) ELECTROLYTE FOR SECONDARY BATTERY AND LITHIUM SECONDARY BATTERY INCLUDING THE SAME

(71) Applicant: LG CHEM, LTD., Seoul (KR)

(72) Inventors: Jong Ho Jeon, Daejeon (KR); Yoo Seok Kim, Daejeon (KR); Doo Kyung Yang, Daejeon (KR); Shulkee Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 83 days.

This patent is subject to a terminal disclaimer.

(21) Appl. No.: 14/489,717

(22) Filed: Sep. 18, 2014

(65) Prior Publication Data

US 2015/0004475 A1    Jan. 1, 2015

Related U.S. Application Data

(63) Continuation of application No. PCT/KR2013/003265, filed on Apr. 18, 2013.

(30) Foreign Application Priority Data

Apr. 20, 2012 (KR) .................. 10-2012-0041282

(51) Int. Cl.
| | | |
|---|---|---|
| *H01M 10/0569* | (2010.01) | |
| *H01M 4/485* | (2010.01) | |
| *H01M 4/525* | (2010.01) | |
| *H01M 4/505* | (2010.01) | |
| *H01M 10/0525* | (2010.01) | |
| *H01M 10/0565* | (2010.01) | |
| *H01M 4/131* | (2010.01) | |
| *H01M 10/0567* | (2010.01) | |
| *H01M 10/0568* | (2010.01) | |

(52) U.S. Cl.
CPC ......... *H01M 10/0569* (2013.01); *H01M 4/131* (2013.01); *H01M 4/485* (2013.01); *H01M 4/505* (2013.01); *H01M 4/525* (2013.01); *H01M 10/0525* (2013.01); *H01M 10/0565* (2013.01); *H01M 10/0567* (2013.01); *H01M 10/0568* (2013.01); *H01M 2220/20* (2013.01); *H01M 2300/0025* (2013.01); *H01M 2300/0037* (2013.01); *H01M 2300/0082* (2013.01); *Y02E 60/122* (2013.01); *Y02T 10/7011* (2013.01)

(58) Field of Classification Search
CPC ................... H01M 10/0569; H01M 10/0565; H01M 10/0525; H01M 4/485; H01M 4/505; H01M 4/525; H01M 4/131; H01M 2300/0037; Y02E 60/122
See application file for complete search history.

(56) References Cited

U.S. PATENT DOCUMENTS

| | | | |
|---|---|---|---|
| 2005/0271943 A1 | 12/2005 | Park et al. | |
| 2006/0046155 A1 | 3/2006 | Inagaki et al. | |
| 2007/0178386 A1 | 8/2007 | Takeda | |
| 2012/0007560 A1* | 1/2012 | Smart ............... | H01M 10/0568 429/200 |
| 2012/0009477 A1 | 1/2012 | Chen et al. | |
| 2013/0189591 A1 | 7/2013 | Nishimura et al. | |
| 2014/0106238 A1* | 4/2014 | Giroud et al. .... | H01M 10/0569 429/332 |

FOREIGN PATENT DOCUMENTS

| | | |
|---|---|---|
| CN | 101017892 A | 8/2007 |
| CN | 101159329 A | 4/2008 |
| CN | 101402469 A | 4/2009 |
| CN | 101462773 A | 6/2009 |
| CN | 102130363 A | 7/2011 |
| EP | 1936731 A1 | 6/2008 |
| JP | 2004-311115 A | 11/2004 |
| JP | 2006-66341 A | 3/2006 |
| JP | 2007-207484 A | 8/2007 |
| JP | 2007-207617 A | 8/2007 |
| JP | 2008-147117 A1 | 6/2008 |
| JP | 2008-192391 A | 8/2008 |
| JP | 2008-282618 A | 11/2008 |
| JP | 2009-134943 A | 6/2009 |
| KR | 10-2012-0030951 A | 3/2012 |
| TW | 200541141 | 12/2005 |
| TW | 201203674 A1 | 1/2012 |
| WO | WO 2009/111860 A1 | 9/2009 |
| WO | WO 2012/046514 A1 | 4/2012 |
| WO | WO 2012/172194 | * 12/2012 |

OTHER PUBLICATIONS

Linden et al., "Characteristics of Organic Solvents" Third Edition, McGraw-Hill, Handbook of Batteries, Aug. 30, 2001, 3 pgs.
International Search Report issued in PCT/KR2013/003265, mailed on Jul. 25, 2013.
Patoux et al., "High voltage spinel oxides for Li-ion batteries: From the material research to the application," Journal of Power Sources, vol. 189, 2009 (available online Aug. 27, 2008), pp. 344-352.
Wu et al., "Synthesis and characterization of abundant Ni-doped $LiNi_xMn_{2-x}O_4$ (x=0.1-0.5) powders by spray-drying method," Electrochimica Acta, vol. 51, 2006 (available online Jan. 18, 2006), pp. 4148-4152.
Chinese Office Action issued in Chinese Patent Application No. 201380016462.6 on Jun. 2, 2016.

* cited by examiner

*Primary Examiner* — Laura Weiner
(74) *Attorney, Agent, or Firm* — Birch, Stewart, Kolasch & Birch, LLP

(57) ABSTRACT

Disclosed are an electrolyte for a lithium secondary battery which includes a non-aqueous solvent and a lithium salt, wherein the non-aqueous solvent includes a cyclic carbonate and a linear solvent, wherein an amount of the cyclic carbonate in the non-aqueous solvent is in the range of 1 wt % to 30 wt % based on a total weight of the non-aqueous solvent and a lithium secondary battery including the same.

6 Claims, No Drawings

ELECTROLYTE FOR SECONDARY BATTERY AND LITHIUM SECONDARY BATTERY INCLUDING THE SAME

CROSS REFERENCE TO RELATED APPLICATIONS

This application is a Continuation of PCT International Application No. PCT/KR2013/003265, filed on Apr. 18, 2013, which claims priority under 35 U.S.C. 119(a) to Patent Application No. 10-2012-0041282, filed in the Republic of Korea on Apr. 20, 2012, all of which are hereby expressly incorporated by reference into the present application.

TECHNICAL FIELD

The present invention relates to a rechargeable lithium secondary battery and an electrolyte constituting the lithium secondary battery.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, continues to be underway, and power storage devices for more efficient use of the generated energy are also drawing much attention.

Specifically, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and the market for lithium secondary batteries continues to expand to applications such as auxiliary power suppliers through smart-grid technology.

A lithium secondary battery has a structure in which an electrode assembly, which includes: a cathode prepared by coating a cathode active material on a cathode current collector; an anode prepared by coating an anode active material on an anode current collector; and a porous separator disposed between the cathode and the anode, is impregnated with a lithium salt-containing non-aqueous electrolyte.

These lithium secondary batteries are generally manufactured by disposing a polyolefin-based porous separator between a cathode including a cathode active material, e.g., metal oxides such as lithium-cobalt based oxides, lithium-manganese based oxides, lithium-nickel based oxides, or the like, an anode including an anode active material, e.g., carbonaceous materials, and impregnating the resultant structure with a non-aqueous electrolyte containing a lithium salt such as $LiPF_6$ or the like.

When the lithium secondary battery is charged, lithium ions of the cathode active material are deintercalated and then are intercalated into a carbon layer of the anode. When the lithium secondary battery is discharged, the lithium ions of the carbon layer are deintercalated and then are intercalated into the cathode active material. In this regard, the non-aqueous electrolyte acts as a medium through which lithium ions migrate between the anode and the cathode.

Recently, instead of using conventional materials as electrode active materials, research into use of spinel-structure lithium nickel-based metal oxides as cathode active materials or use of lithium titanium oxides and the like as anode active materials has been conducted.

Reaction at an interface between the electrode and the electrolyte varies according to kinds of electrode materials and electrolyte used in the lithium secondary battery. Therefore, there is a need to develop electrolyte techniques that can be suitably adapted to changes in electrode composition.

DISCLOSURE

Technical Problem

Therefore, the present invention has been made to solve the above problems and other technical problems that have yet to be resolved.

As a result of a variety of extensive and intensive studies and experiments, the inventors of the present invention found that when a mixture of a cyclic carbonate and a linear solvent is used as a non-aqueous electrolyte, the amount of the cyclic carbonate is adjusted within a predetermined range, whereby a lithium secondary battery including the same is stable at high voltages and has enhanced rate characteristics, thus completing the present invention.

Technical Solution

In accordance with one aspect of the present invention, provided is an electrolyte for a lithium secondary battery which includes a non-aqueous solvent and a lithium salt, wherein the non-aqueous solvent includes a cyclic carbonate and a linear solvent, wherein the amount of the cyclic carbonate in the non-aqueous solvent is in the range of 1 wt % to 30 wt % based on a total weight of the non-aqueous solvent.

The present invention also provides a lithium secondary battery in which an electrode assembly including a cathode, an anode, and a separator disposed between the cathode and the anode is accommodated in a battery case and the battery case is sealed. The lithium secondary battery may include the electrolyte for a lithium secondary battery.

Specifically, the lithium secondary battery may include an electrolyte for a lithium secondary battery that may include a lithium metal oxide represented by Formula (1) below as a cathode active material, a lithium metal oxide represented by Formula (3) below as an anode active material, and a cyclic carbonate and a linear solvent, as a non-aqueous solvent, wherein the amount of the cyclic carbonate in the non-aqueous solvent is in the range of 1 wt % to 30 wt % based on the total weight of the non-aqueous solvent.

In general, in a secondary battery that uses graphite as an anode active material and, as an electrolyte solvent, a mixed solvent including a low-viscosity linear carbonate, e.g., dimethyl carbonate (DMC), ethyl methyl carbonate (EMC), or diethyl carbonate (DEC) and a cyclic carbonate, when the electrolyte includes 30 wt % or less of the cyclic carbonate, problems in terms of formation of an anode protective film (e.g., solid electrolyte interface (SEI) film) occur and thus lifespan characteristics are dramatically deteriorated. In addition, when a linear ester is used instead of the linear carbonate, reduction at the anode excessively occurs relative to a carbonate-based low-viscosity solvent, and thus, there is a need to use a large amount of the cyclic carbonate or use an additive for forming an anode protective film, such as vinylene carbonate (VC).

However, the inventors of the present invention confirmed that when the same composition as that of the above-described electrolyte is applied to a secondary battery that uses a compound represented by Formula (1) below as a cathode active material and a compound represented by Formula (3) below as an anode active material, problems occur as follows.

First, when the compound of Formula (1) is used as a cathode active material, a cathode operates at a high voltage with respect to lithium and thus the electrolyte is decomposed due to low oxidation voltage of vinylene carbonate (VC) and components of the cathode active material, e.g., a transition metal, oxygen, and the like, are eluted and the eluted components are deposited on a surface of the anode, whereby battery performance is deteriorated. Or, secondary problems, such as deterioration of battery performance due to decomposition of components of the electrolyte, e.g., a solvent or a lithium salt, may occur.

Second, when an electrolyte including 30 wt % or more of cyclic carbonate is applied to a lithium secondary battery including the compound of Formula (3) below as an anode active material used to achieve high-rate charge/discharge, lifespan characteristics and rate characteristics are worse than when a smaller amount of the cyclic carbonate is used.

As is common knowledge in the art, as conductivity of lithium ions increases, high-rate charge/discharge characteristics of a battery are enhanced. In addition, when the amount of the cyclic carbonate is about 30 wt % or less, e.g., in the range of 10 to 20 wt %, it can be confirmed that ionic conductivity is reduced, whereas rate characteristics are rather enhanced when the electrolyte includes a small amount of the cyclic carbonate.

Thus, the inventors of the present invention repeatedly performed intensive studies and discovered that when the compound of Formula (3) below is used as an anode active material and the electrolyte including a mixed solvent of a small amount of a cyclic carbonate and a linear solvent is used, problems in terms of reduction at the anode including the compound of Formula (3) below having high stability for reduction of the electrolyte do not occur due to high reduction potential, and lifespan and rate characteristics may be enhanced. In addition, the inventors discovered that when a high-voltage cathode active material, e.g., the compound of Formula (1) below, is used, elution of components of the cathode active material and generation of by-products such as carbon dioxide or carbon monoxide due to surface reaction may be suppressed or reduced.

When the amount of the cyclic carbonate is less than 1 wt %, improvement in ionic conductivity, which is a strong point of cyclic carbonate-based materials, may not be obtained. On the other hand, when the amount of the cyclic carbonate exceeds 30 wt %, the amount of the linear solvent is relatively small and thus desired effects, i.e., improvement in lifespan characteristics and stability of oxidation at a surface of a high-voltage cathode, may not be achieved.

In a specific embodiment, a weight ratio of the cyclic carbonate to the linear solvent may be 10-20: 80-90, for example, 10:90.

The cyclic carbonate may be any ring-type carbonate. For example, the cyclic carbonate may be propylene carbonate, ethylene carbonate (EC), butylene carbonate, vinylene carbonate, or any combination thereof, but is not limited thereto.

The linear solvent is not particularly limited, and may be, for example, a linear carbonate or a linear ester.

For example, the linear carbonate may be dimethyl carbonate (DMC), diethyl carbonate (DEC), ethylmethyl carbonate (EMC), or any combination thereof, but is not limited thereto.

Preferably, a mixture of DMC and EC may be used.

As confirmed in Experimental Example 1, when the mixture of DMC and EC is used, superior lifespan characteristics may be obtained as compared to a case in which a mixture of EMC, DMC, and EC is used. In addition, it can be confirmed that when a mixture of EMC and EC is used, lifespan characteristics are deteriorated as compared to a case in which the mixture of DMC and EC is used.

The lithium secondary battery may be a lithium ion battery or a lithium ion polymer battery.

The cathode or anode may be fabricated using a manufacturing method including the following processes.

The electrode manufacturing method includes: preparing a binder solution by dispersing or dissolving a binder in a solvent; preparing an electrode slurry by mixing the binder solution, an electrode active material, and a conductive material; coating the electrode slurry on a current collector; drying the electrode; and compressing the electrode to a uniform thickness.

In some cases, the electrode manufacturing method may further include drying a rolled electrode.

Preparation of the binder solution is a process of preparing a binder solution by dispersing or dissolving a binder in a solvent.

The binder may be any binder known in the art and, in particular, may be selected from the group consisting of fluorine resins, polyolefins, styrene-butadiene rubbers, carboxymethyl cellulose, mussel protein (dopamine), silanes, ethylcellulose, methylcellulose, hydroxypropyl cellulose, polyethylene glycol, polyvinyl alcohol, and acryl-based copolymers.

The solvent may be optionally used according to the kind of the binder and may be, for example, an organic solvent such as isopropyl alcohol, N-methylpyrrolidone (NMP), acetone, or the like, or water.

In a specific embodiment, a binder solution for a cathode may be prepared by dispersing or dissolving PVdF in NMP.

The electrode active material and the conductive material may be mixed with or dispersed in the binder solution to prepare the electrode slurry. The electrode slurry may be transferred to a storage tank and stored until the electrode slurry is used in the coating process. To prevent the electrode slurry from hardening, the electrode slurry may be continuously stirred in the storage tank.

Examples of the electrode active material include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-y}M_yO_2$ where M=Co, Mn, Al, Cu, Fe, Mg, B, or Ga, and $0.01 \leq y \leq 0.3$; lithium manganese composite oxides of Formula $LiMn_{2-y}M_yO_2$ where M=Co, Ni, Fe, Cr, Zn, or Ta, and $0.01 \leq y \leq 0.1$), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; $Fe_2(MoO_4)_3$; metal composite oxides such as $Li_xFe_2O_3$ where $0 \leq x \leq 1$, $Li_xWO_2$ where $0 \leq x \leq 1$, $Sn_xMe_{1-x}Me'_yO_x$ where Me: Mn, Fe, Pb or Ge; Me': Al, B, P, Si, Group I, Group II and Group III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

In a non-restrictive embodiment, the electrode active material may include a spinel-structure lithium metal oxide represented by Formula (1) below:

$$Li_xM_yMn_{2-y}O_{4-z}A_z \quad (1)$$

wherein $0.9 \leq x \leq 1.2$, $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

A maximum substitution amount of A may be less than 0.2 mol % and, in particular, A may be at least one anion selected from the group consisting of halogens such as F, Cl, Br, and I, S, and N.

Due to substitution of the at least one anion, bonding strength between the anion and the transition metal is increased and structural transition of the compound of Formula (1) is prevented, and thus, lifespan of the lithium secondary battery may be enhanced. On the other hand, when the substitution amount of A is too large ($t \geq 0.2$), lifespan characteristics of the lithium secondary battery may be rather deteriorated due to an unstable crystal structure of the compound of Formula (1).

Specifically, the spinel-structure lithium metal oxide of Formula (1) may be a lithium metal oxide represented by Formula (2) below:

$$Li_xNi_yMn_{2-y}O_4 \quad (2)$$

wherein $0.9 \leq x \leq 1.2$ and $0.4 \leq y \leq 0.5$.

More specifically, the lithium metal oxide may be $LiNi_{0.5}Mn_{1.5}O_4$ or $LiNi_{0.4}Mn_{1.6}O_4$.

In addition, in a non-restrictive embodiment, the electrode active material may include a lithium metal oxide represented by Formula (3) below:

$$Li_aM'_bO_{4-c}A_c \quad (3)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ wherein a and b are determined according to oxidation number of M';

$0 \leq c \leq 0.2$ wherein c is determined according to oxidation number; and

A is at least one monovalent or divalent anion.

The lithium metal oxide of Formula (3) may be represented by Formula (4) below:

$$Li_aTi_bO_4 \quad (4)$$

wherein $0.5 \leq a \leq 3$ and $1 \leq b \leq 2.5$.

Examples of the lithium metal oxide include, but are not limited to, $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$.

In a non-restrictive embodiment, the lithium metal oxide may be $Li_{1.33}Ti_{1.67}O_4$ or $LiTi_2O_4$. In this regard, $Li_{1.33}Ti_{1.67}O_4$ has a spinel structure having a small change in crystal structure during charge/discharge and high reversibility.

The lithium metal oxide may be prepared using a manufacturing method known in the art, for example, solid-state reaction, a hydrothermal method, a sol-gel method, or the like. A detailed description of known manufacturing methods is omitted.

The lithium metal oxide may be in the form of a secondary particle in which primary particles are agglomerated with one another.

The secondary particle may have a diameter of 200 nm to 30 μm.

When the diameter of the secondary particle is less than 200 nm, reduction in adhesion is caused during an anode fabrication process. To address this problem, a larger amount of a binder needs to be used, which is not desirable in terms of energy density. On the other hand, when the diameter of the secondary particle exceeds 30 μm, diffusion rate of lithium ions is slow and thus it may be difficult to achieve high output.

The amount of the lithium metal oxide may be equal to or greater than 50 wt % to equal to or less than 100 wt % based on a total weight of the anode active material.

The conductive material is not particularly limited so long as it has suitable conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may further optionally include a filler or the like, as desired.

The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry on a current collector is a process of coating the electrode slurry on a current collector in a predetermined pattern and to a uniform thickness by passing through a coater head.

The coating of the electrode slurry on a current collector may be performed by applying the electrode slurry to the current collector and uniformly dispersing the electrode slurry thereon using a doctor blade. The coating process may be performed by, for example, die casting, comma coating, screen printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A cathode current collector may have fine irregularities at a surface thereof to increase adhesion between a cathode active material and the cathode current collector and be used in any of various forms including films, sheets, foils, nets, porous structures, foams, and non-woven fabrics. Specifically, the cathode current collector may be a metal current collector, e.g., an Al current collector, and an anode current collector may be a metal current collector, e.g., a Cu current collector. The electrode current collector may be a metal foil, e.g., Al foil or Cu foil.

The drying process is a process of removing solvent and moisture from the electrode slurry to dry the electrode slurry coated on the current collector. Specifically, the drying process is performed in a vacuum oven at 50 to 200° C. for one day or less.

The electrode manufacturing method may further include a cooling process after the drying process. The cooling process may be performed by slow cooling up to room temperature so that a recrystallized structure of the binder is satisfactorily formed.

To increase capacity density of the coating-completed electrode and increase adhesion between the current collector and the corresponding active material, the electrode may be compressed to a desired thickness by passing between two high-temperature heated rolls. This process is referred to as a rolling process.

Before passing between the two high-temperature heated rolls, the electrode may be subjected to a preheating process. The preheating process is a process to preheat the electrode before passing between the rolls in order to enhance compression of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be performed. The cooling process may be performed by slow cooling to room temperature such that a recrystallized structure of the binder is satisfactorily formed.

The separator may be an insulating thin film having high ion permeability and mechanical strength. The separator typically has a pore diameter of 0.01 to 10 μm and a thickness of 5 to 300 nm.

As the separator, sheets or non-woven fabrics made of an olefin polymer such as polypropylene, glass fibers, or polyethylene, which have chemical resistance and hydrophobicity, Kraft paper, or the like may be used. Applicable commercially available separators include Celgard type products (Celgard® 2400, 2300: Hoechest Celanese Corp.), polypropylene separators (Ube Industries Ltd., Pall RAI's products), polyethylene type separators (Tonen or Entek), and the like.

In some cases, the separator may be coated with a gel polymer electrolyte in order to increase stability of the lithium secondary battery. Examples of gel polymers include polyethylene oxide, polyvinylidene fluoride, and polyacrylonitrile.

Examples of the electrode assembly include a jelly-roll type electrode assembly (or a winding-type electrode assembly), a stack-type electrode assembly, and a stack/folding electrode assembly, which are known in the art.

As used herein, the stack/folding electrode assembly may be understood to include stack/folding electrode assemblies manufactured by arranging a unit cell having a structure in which a separator is disposed between a cathode and an anode on a separator sheet and folding or winding the separator sheet.

In addition, the electrode assembly may include an electrode assembly in which a structure having any one of a cathode and an anode disposed between separators is laminated in a stacked state by thermal bonding.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The lithium secondary battery according to the present invention may be used in battery cells used as a power source of small devices and may also be suitable for use as a unit cell in medium and large battery modules including a plurality of battery cells.

The present invention also provides a battery pack including the battery module as a power source of a medium and large device. Examples of medium and large devices include, but are not limited to, electric vehicles (EVs), hybrid electric vehicles (HEVs), plug-in hybrid electric vehicles (PHEVs), and apparatuses for storing power.

Structures and manufacturing methods of the battery module and the battery pack are known in the art, and thus, a detailed description thereof is omitted.

Effects of Invention

As apparent from the fore-going, the present invention provides a lithium secondary battery including the compound of Formula (1) and/or the compound of Formula (3) as an electrode active material and thus may have improved lifespan characteristics.

The lithium secondary battery according to the present invention also improves the rate characteristic by the increased ion conductivity.

Best Mode

Now, the present invention will be described in more detail with reference to the following examples. These examples are provided only for illustration of the present invention and should not be construed as limiting the scope and spirit of the present invention.

EXAMPLES AND COMPARATIVE EXAMPLES

Solids including $Li(Ni_{0.5}Mn_{1.5})O_4$ (available from BASF): Super P (available from Timcal): PVdF(Solef® 6020), in a weight ratio of 90:5:5, were mixed with NMP as a solvent to prepare a cathode slurry. The cathode slurry was coated on Al foil having a thickness of 20 μm to manufacture a cathode having a loading amount of 1.0 mAh/cm².

Separately, solids including $Li_{1.33}Ti_{1.67}O_4$ (available from Posco ESM; T30): Super P (available from Timcal): PVdF (Solef® 6020), in a weight ratio of 90:5:5, were mixed with NMP as a solvent to prepare an anode slurry. The anode slurry was coated onto Al foil having a thickness of 20 μm to manufacture an anode having a loading amount of 1.0 mAh/cm².

Battery cells each including the cathode, the anode, and a polyethylene membrane as a separator (Celgard, thickness: 20 μm) and including electrolytes having compositions shown in Table 1 below were manufactured.

TABLE 1

| | Electrolyte |
|---|---|
| Example 1 | Carbonate electrolyte containing 1M LiPF$_6$ in EC:DMC (5:95 weight ratio) |
| Example 2 | Carbonate electrolyte containing 1M LiPF$_6$ in EC:DMC (10:90 weight ratio) |
| Example 3 | Carbonate electrolyte containing 1M LiPF$_6$ in EC:DMC (20:80 weight ratio) |
| Example 4 | Carbonate electrolyte containing 1M LiPF$_6$ in EC:DMC (30:70 weight ratio) |
| Comparative Example 1 | Carbonate electrolyte containing 1M LiPF$_6$ in EC:DMC (50:50 weight ratio) |
| Comparative Example 2 | Carbonate electrolyte containing 1M LiPF$_6$ in EC:EMC (50:50 weight ratio) |
| Comparative Example 3 | Carbonate electrolyte containing 1M LiPF$_6$ in EC:EMC:DMC (30:30:40 weight ratio) |

Experimental Example 200 charge/discharge cycles were performed using the battery cells manufactured according to Examples 1 to 4 and Comparative Examples 1 to 3 at 1.5 to 3.5 V and 3 C. Capacity retention ratio of each battery cell after 200 cycles is shown in Table 2 below. Referring to Table 2, it can be confirmed that the battery cells of Examples 1 to 4 including the electrolyte containing EC: DMC in a weight ratio that is equal to or less than 30:70 exhibit excellent lifespan characteristics when compared to the battery cells of Comparative Examples 1 to 3.

TABLE 2

| LTO/LNMO (1.5~3.5 V, coin full-cell) 3 C/3 C-rate cycle life test (1 C-rate = 1.49 mA) | 200$^{th}$ Capacity retention (%, vs. 1$^{st}$), Capacity (mAh): 1$^{st}$ ->200$^{th}$ |
|---|---|
| Example 1 | 92.5%, 1.48 mAh->1.37 mAh |
| Example 2 | 96.5%, 1.48 mAh->1.43 mAh |
| Example 3 | 95.8%, 1.47 mAh->1.41 mAh |
| Example 4 | 93.3%, 1.39 mAh->1.30 mAh |
| Comparative Example 1 | 57.7%, 1.08 mAh->0.62 mAh |
| Comparative Example 2 | 39%, 1.06 mAh->0.41 mAh |
| Comparative Example 3 | 86.1%, 1.30 mAh->1.12 mAh |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising an electrolyte and an electrode assembly comprising a cathode, an anode, and a polymer membrane disposed between the cathode and the anode, the electrode assembly being accommodated in a battery case, wherein the cathode comprises a spinel-structure lithium metal oxide represented by Formula (2) below:

$$Li_xNi_yMn_{2-y}O_4 \qquad (2)$$

wherein 0.9≤x≤1.2 and 0.4≤y≤0.5, the anode comprises a lithium metal oxide represented by Formula (4) below:

$$Li_aTi_bO_4 \qquad (4)$$

wherein 0.5≤a≤3 and 1≤b≤2.5, and, wherein the electrolyte comprises a non-aqueous solvent and a lithium salt, in which the non-aqueous solvent comprises a cyclic carbonate and a linear solvent, wherein an amount of the cyclic carbonate in the non-aqueous solvent is in a range of 1 wt % to 30 wt % based on a total weight of the non-aqueous solvent, and wherein an amount of the linear solvent in the non-aqueous solvent is in a range of 70 wt % to 99 wt % based upon the total weight of the non-aqueous solvent, wherein the linear solvent is a linear carbonate, wherein the linear carbonate is dimethyl carbonate (DMC), and wherein the cyclic carbonate is ethylene carbonate (EC).

2. The lithium secondary battery according to claim 1, wherein the lithium metal oxide is LiNi$_{0.5}$Mn$_{1.5}$O$_4$ or LiNi$_{0.4}$Mn$_6$O$_4$.

3. The lithium secondary battery according to claim 1, wherein the lithium metal oxide is Li$_{1.33}$Ti$_{1.67}$O$_4$ or LiTi$_2$O$_4$.

4. The lithium secondary battery according to claim 1, wherein the lithium secondary battery is a lithium ion battery.

5. The lithium secondary battery according to claim 1, wherein the lithium secondary battery is a lithium ion polymer battery.

6. The lithium secondary battery according to claim 1, wherein the lithium secondary battery has a capacity retention ratio in a range of 90% to 100% after 200 charge/discharge cycles at 3 C-rate.

* * * * *